Figure 1:
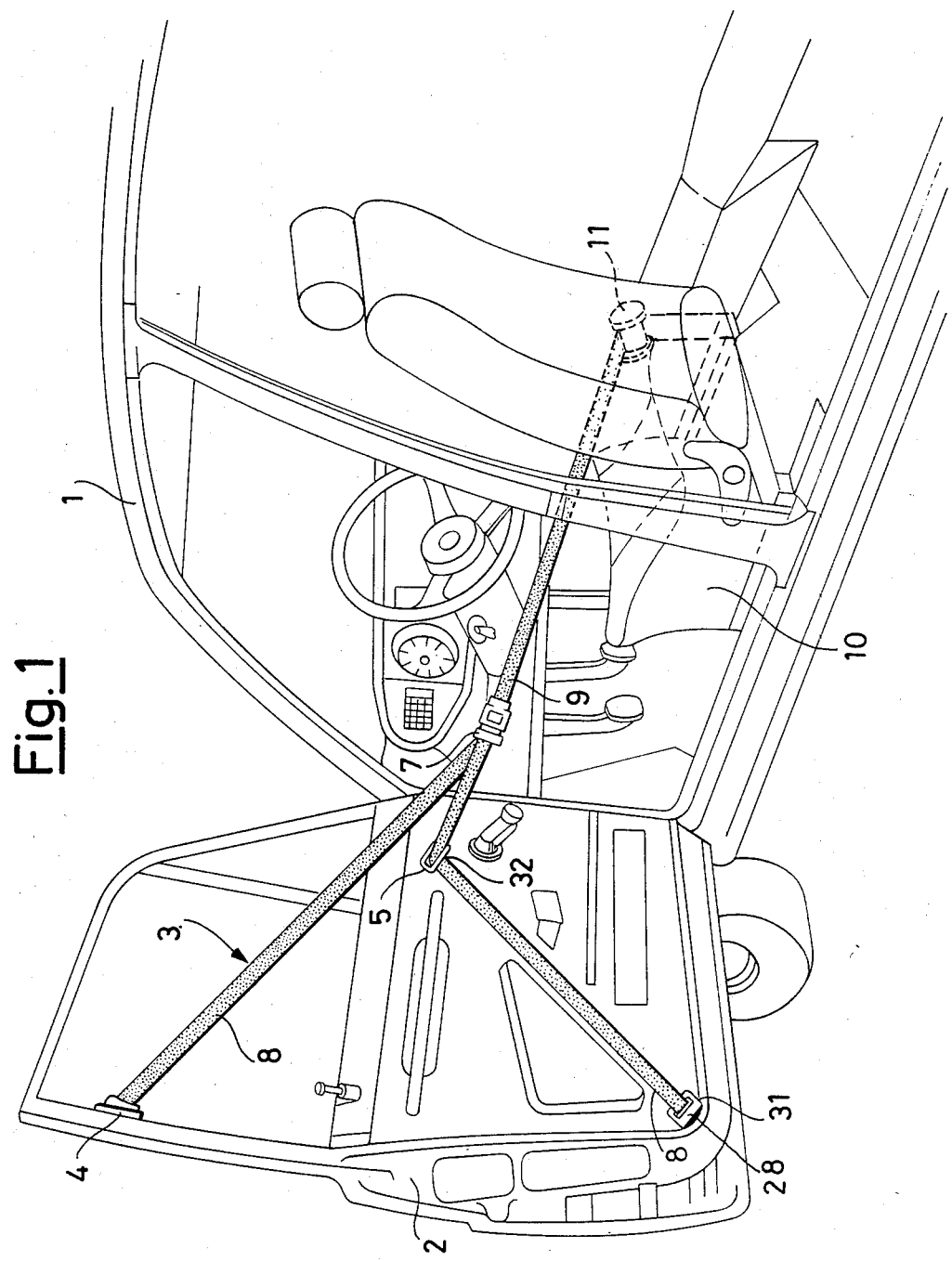

United States Patent [19]

Paludetto

[11] Patent Number: 4,564,217
[45] Date of Patent: Jan. 14, 1986

[54] AUTOMATIC POSITIONING DEVICE FOR MOTOR VEHICLE SAFETY BELTS

[75] Inventor: Ferdinando Paludetto, Cesano Boscone, Italy

[73] Assignee: Alfa Romeo Auto S.p.A., Naples, Italy

[21] Appl. No.: 555,020

[22] Filed: Nov. 25, 1983

[30] Foreign Application Priority Data

Dec. 3, 1982 [IT] Italy .................. 23636/82[U]

[51] Int. Cl.⁴ .............................................. B60R 21/10
[52] U.S. Cl. ..................................................... 280/804
[58] Field of Search ................................ 280/802, 804

[56] References Cited

U.S. PATENT DOCUMENTS

| | | | |
|---|---|---|---|
| 3,831,971 | 8/1974 | Kaneko et al. | 280/802 |
| 3,895,824 | 7/1975 | Bauer et al. | 280/804 |
| 4,225,154 | 9/1980 | Takada | 280/804 |
| 4,316,619 | 2/1982 | Suzuki et al. | 280/804 |
| 4,335,902 | 6/1982 | Motonami et al. | 280/804 |

FOREIGN PATENT DOCUMENTS 72439 5/1980 Japan ........................... 280/802

Primary Examiner—Joseph F. Peters, Jr.
Assistant Examiner—Kenneth R. Rice
Attorney, Agent, or Firm—Charles E. Brown; Charles A. Brown

[57] ABSTRACT

An automatic positioning device for a passive safety belt able to move a mobile positioning point for the belt in order to retain and release the seat occupant by opening and closing the door, comprising a rack bar of arcuate shape rigidly fixed at one end to the vehicle body, and a pinion engaging therewith which is rotatably supported by the door and operationally connected to an amplifier mechanism which is itself operationally connected to the belt and is able to convert the rotary movement of the pinion into an amplified rectilinear movement of said positioning point along a rail disposed diagonally on the door.

5 Claims, 3 Drawing Figures

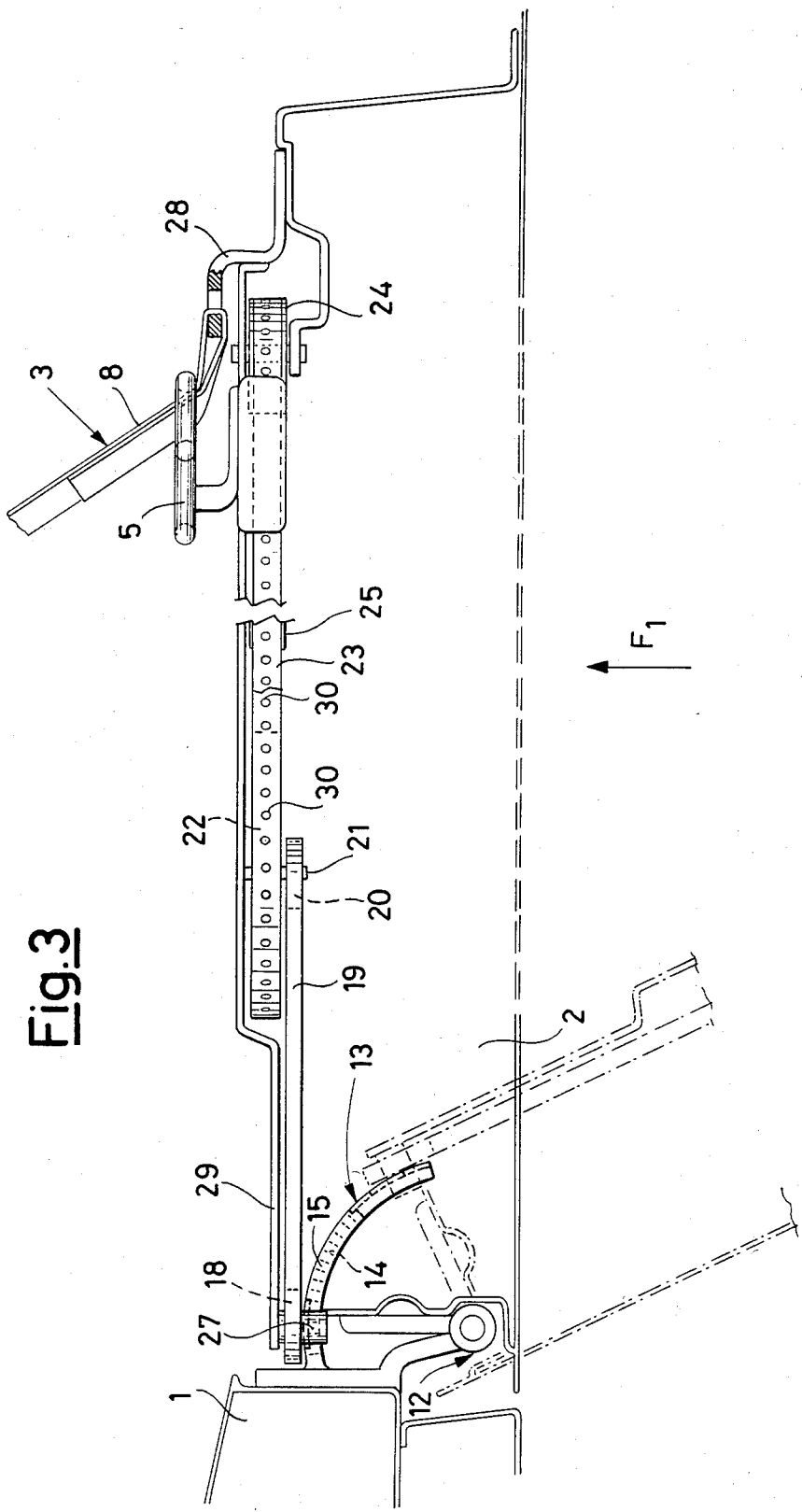

AUTOMATIC POSITIONING DEVICE FOR MOTOR VEHICLE SAFETY BELTS

This invention relates to a device for effectively retaining the occupant of a motor vehicle seat by means of a self-positioning (passive) safety belt and easily releasing him therefrom, by opening and closing the vehicle door.

Various devices have recently been proposed for automatically positioning safety belts about the body of the occupant, some being of mechanical type and using lever systems, while others use an electric motor for moving one or more points hooked to the belt. The object of the present invention is to provide a mechanical device able to move a mobile positioning point for the safety belt from a position in which the seat occupant is retained to a position in which said occupant is released, and in which said mobile positioning point is slidably guided by a rail which extends substantially along a diagonal of the vehicle door. In particular, the mechanical device according to the invention is able to amplify the movement involved in opening the door, in order to cause the mobile point at which the belt is positioned on said door to move to a sufficient extent such that when the door is open, the seat occupant is automatically released from the belt.

The device specifically includes a rack bar of arcuate shape which is rigidly fixed at one end to the vehicle body and engages with a pinion rotatably supported by the door and operationally connected to an amplifier mechanism disposed on said door.

The amplifier mechanism is operationally connected to the mobile positioning point for the safety belt and comprises means able to convert the rotary movement of the pinion into an amplified rectilinear movement of said mobile positioning point along a rail disposed diagonally on the door.

In a preferred embodiment, the device for positioning the safety belt comprises a circular arc-shaped rack bar rigidly fixed to the vehicle body and disposed concentrically to the door hinging axis. The engagement between the pinion and rack is ensured by a bush idly mounted on a pin fixed to the door, said bush acting as a counteracting member and being disposed parallel to the pinion on the smooth side of the rack so that the pinion and bush simultaneously rotate on the rack.

Figure 2:
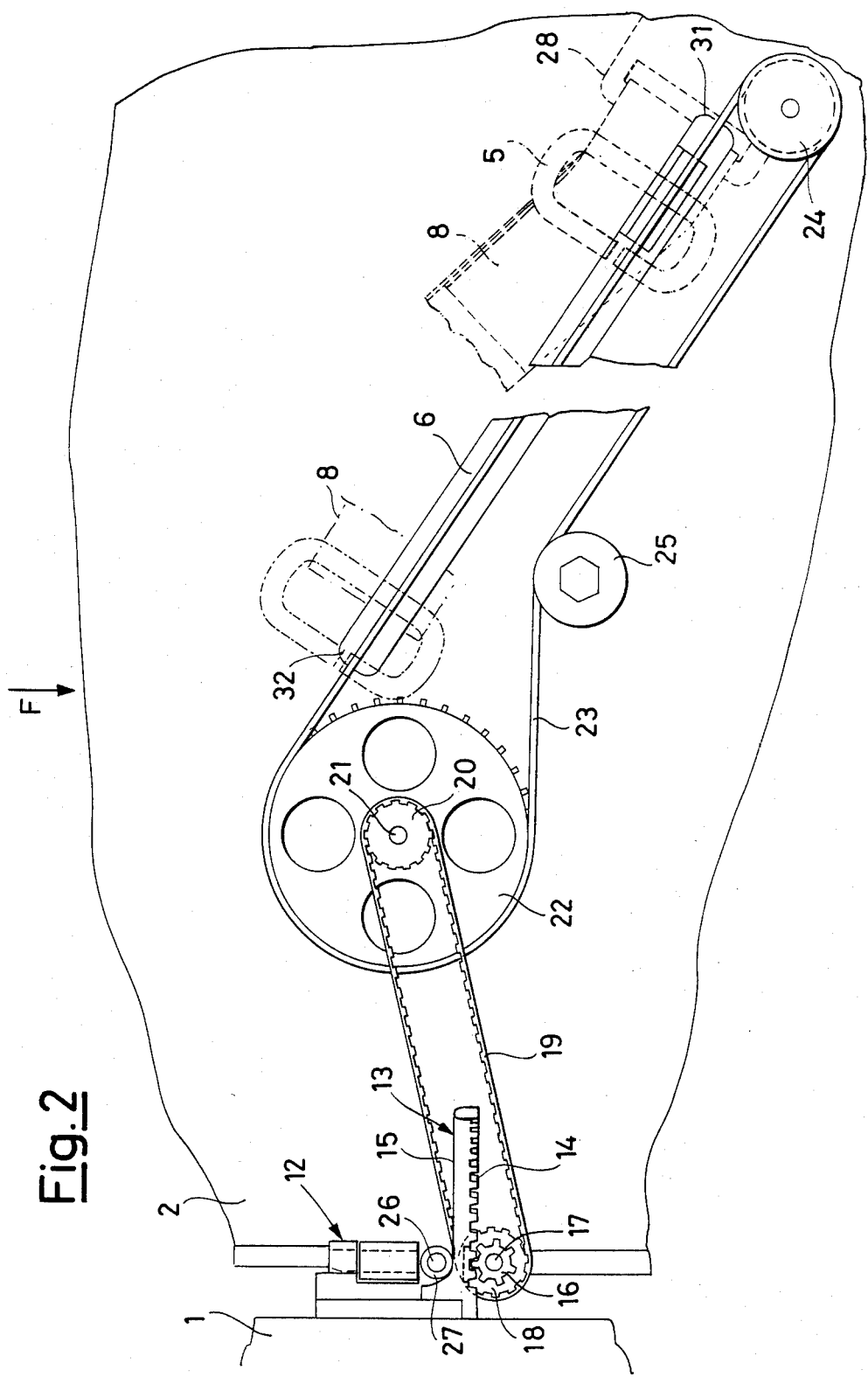

The characteristics and advantages of the present invention will be more apparent from the description of one embodiment given hereinafter by way of non-limiting example and illustrated on the accompanying drawings, in which:

FIG. 1 is a partial view of a vehicle passenger compartment and its door, with a belt shown diagrammatically in its release position and provided with a device according to the invention, FIG. 2 is a diagrammatic view of the automatic positioning device along the arrow F1 of FIG. 3, with the door closed, FIG. 3 is a plan view of the device of FIG. 2, along the arrow F.

With reference to the figures, a device for retaining and releasing an occupant of a seat 10 uses a three-point safety belt indicated overall by the reference numeral 3.

Said safety belt 3 is anchored at 4 to an upper end of the door 2, to a bracket 28 at a lower part of the door 2, and finally to a winder reel 11 fixed to the seat 10 or to the vehicle body.

A ring 5, through which the belt 3 passes, slides in a rail 6 fixed to the door 2, from a point 31 to a point 32 and vice versa. A buckle 7 divides the belt 3 into two portions, namely a retention portion 8 constituted by a thoracic branch and an abdominal branch, and a portion 9 which alternately unwinds from and winds on to said winder reel 11.

In FIG. 2, the reference numeral 12 indicates overall a hinge on which the door 2 rotates relative to the vehicle body 1, and the reference numeral 13 indicates overall a rack bar in the form of a circular arc, which is provided lowerly with toothing 14 and upperly with a flat surface 15. The toothing 14 engages with a pinion 16 rotatably mounted on a pin 17 on which there is also concentrically disposed a first toothed wheel 18 of greater diameter than the pinion 16, with which it is rigid. A pin 26 which rotatably supports a bush 27 disposed parallel to the pinion 16 ensures engagement between the rack toothing 14 and the pinion 16. Said toothed wheel 18 is connected by a toothed belt 19 to a second toothed wheel 20 rotatably mounted on a pin 21. Concentric with and rigidly coupled to the wheel 20 there is disposed a third toothed wheel 22 of greater diameter. The reference numeral 23 indicates a perforated belt on which the ring 5 is rigidly fixed. The reference numeral 24 indicates a transmission pulley for the perforated belt 23, and 25 a tensioning pulley.

In FIG. 3, the components visible in the two preceding figures are indicated by the same reference numerals, the reference numeral 28 indicating the belt connection bracket disposed at the point 31 of the door 2, 29 indicating a metal plate of the door 2 for supporting the amplifier device, and 30 indicating the holes in the perforated belt 23.

When the door 2 is moved on the hinge 12 with rotary movement relative to the vehicle body 1 on which the rack bar 13 is rigidly fixed, the pinion 16 disposed on the door 2 is obliged to roll on the rack, thus also rotating the first toothed wheel 18 which is rigid with the pinion 16. The toothed belt 19 becomes driven, and rotates the second toothed wheel 20 and the third toothed wheel 22, which drives the perforated belt 23. The movement of the perforated belt 23 results in movement of the ring 5, which moves from the point 31 to the point 32 during door opening, and moves in the opposite direction during closure. In this manner, access is allowed to the seat when the door is open, whereas when the door 2 is closed the safety belt becomes positioned in such a manner as to retain the occupant of the seat 10.

I claim:

1. An automatic positioning device for a passive safety seat belt of a vehicle having a body and a door hingedly connected to said body by a hinge having a hinging axis, said safety seat belt having a mobile positioning point defined by a positioning member and controlled by the open and closed positions of said vehicle door whereby to retain and release a seated occupant of said vehicle in accordance with the position of said door, the improvement residing in means for controlling the position of said mobile positioning point, said means comprising a rack bar having one end fixedly secured to said body and freely passing into said door, said rack bar having the shape of a circular arc and being positioned concentric to said hinging axis, a pinion carried by said door for rotation about a shaft fixed to said door, said pinion being positioned relative to said hinging axis to engage said rack bar in meshing relation and to be rotated by said rack bar in response to opening and closing movement of said door, a rectilinear movement amplifier mechanism coupled to said positioning member for converting rotary movement of said pinion to amplified rectilinear movement of said positioning member, a rail fixedly mounted on said door in a diagonal position, said positioning member being mounted on said rail for guided movement in response to rotation of said pinion.

2. A device as claimed in claim 1, characterized by being provided with a bush rotatably supported by a pin fixed on the door parallel to said pinion, the bush being engaged with a smooth side of the rack bar.

3. An automatic positioning device in accordance with claim 1 wherein said rectilinear movement amplifier mechanism includes an endless positioning belt having a run disposed adjacent to and parallel to said rail, and said positioning member being connected to said positioning belt along said run.

4. An automatic positioning device in accordance with claim 3 wherein said positioning belt is a perforated belt, said positioning member is a ring receiving said safety belt, and said ring is coupled to said perforated belt along said run by way of at least one perforation.

5. An automatic positioning device in accordance with claim 4 wherein said safety belt is slidably supported by said ring and has one end fixedly secured to said door adjacent a lower end of said bar.

* * * * *